(12) United States Patent
Chou et al.

(10) Patent No.: US 7,315,010 B2
(45) Date of Patent: *Jan. 1, 2008

(54) ELECTRIC HEAT SEALER WITH SAFETY DEVICE

(75) Inventors: Shu Hui Chou, Taipei Hsien (TW); Richard Chang, Taipei Hsien (TW)

(73) Assignee: WELCOME Co., Ltd., Hsi Chih Town, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/214,629

(22) Filed: Aug. 29, 2005

(65) Prior Publication Data

US 2005/0284858 A1  Dec. 29, 2005

Related U.S. Application Data

(63) Continuation of application No. 10/637,244, filed on Aug. 8, 2003, now Pat. No. 6,936,790, which is a continuation of application No. 09/735,257, filed on Dec. 12, 2000, now Pat. No. 6,627,853, which is a continuation of application No. 09/189,359, filed on Nov. 9, 1998, now Pat. No. 6,232,579, which is a continuation-in-part of application No. 08/917,358, filed on Aug. 26, 1997, now Pat. No. 5,854,466.

(30) Foreign Application Priority Data

Oct. 11, 1997   (TW)   ............... 86218879 U

(51) Int. Cl.
*H05B 3/02* (2006.01)
*H05B 1/00* (2006.01)

(52) U.S. Cl. .............. 219/243; 219/227; 219/229

(58) Field of Classification Search ............ 219/243, 219/227, 229, 388, 261, 228, 230, 240, 241, 219/221, 524, 535, 544; 156/579, 515, 538.1–538.3, 156/538.8, 538.9, 498–499
See application file for complete search history.

(56) References Cited

U.S. PATENT DOCUMENTS

| RE8,282 | E | 6/1878 | Eaton |
| 1,083,386 | A | 1/1914 | Chapman |
| 1,656,690 | A | 1/1928 | Blackburn |
| 1,850,280 | A | 3/1932 | Haynes |
| 2,364,433 | A * | 12/1944 | Finlayson ............ 219/257 |
| 2,371,428 | A | 3/1945 | Gilliver |

(Continued)

FOREIGN PATENT DOCUMENTS

FR   969.962   12/1950

(Continued)

*Primary Examiner*—Quang Van
(74) *Attorney, Agent, or Firm*—Jeffer Mangels Butler & Marmaro LLP

(57) ABSTRACT

An electric heat sealer for sealing workpieces such as plastic bags or the like includes a casing defining a battery chamber, a press bar pivotally connected to the casing, a sealing mechanism supported on a compression spring in a spring holder inside the casing, and a safety device. The sealing mechanism is electrically connected to produce heat for sealing the workpiece being put thereon when the press bar pressed against the sealing mechanism. The safety device breaks the electrical circuit when the apparatus is not in use.

18 Claims, 5 Drawing Sheets

U.S. PATENT DOCUMENTS

| | | | |
|---|---|---|---|
| 2,371,438 A | 3/1945 | Gilliver | 219/4 |
| 2,465,722 A | 3/1949 | Hamilton | |
| 2,535,171 A | 12/1950 | Sunstrom | |
| 2,610,137 A | 9/1952 | Williamson | |
| 2,669,642 A | 2/1954 | Menges | |
| 2,974,717 A | 3/1961 | Lindsay | |
| 3,106,630 A | 10/1963 | Klamp | |
| 3,319,047 A | 5/1967 | Jones, Jr. et al. | |
| 3,322,603 A | 5/1967 | Grasso | |
| 3,381,450 A | 5/1968 | Monks | |
| 3,408,478 A | 10/1968 | Penn | |
| 3,624,349 A | 11/1971 | Mayer | |
| 3,660,959 A | 5/1972 | La Fleur | |
| 3,731,054 A | 5/1973 | Bair | |
| 3,752,017 A | 8/1973 | Lloyd et al. | |
| 3,822,164 A | 7/1974 | Guido et al. | |
| 3,847,712 A * | 11/1974 | Hubbard | 156/515 |
| 3,912,575 A | 10/1975 | Zelnick | |
| 3,962,017 A | 6/1976 | Wyse | |
| 4,034,201 A * | 7/1977 | Walter et al. | 219/222 |
| 4,082,941 A | 4/1978 | Sukow et al. | |
| 4,093,500 A | 6/1978 | Browne | |
| 4,212,311 A | 7/1980 | del Valle | |
| 4,213,460 A | 7/1980 | Weiner | |
| 4,247,753 A | 1/1981 | Jaronen | |
| 4,438,323 A | 3/1984 | Millnes | |
| D277,386 S | 1/1985 | Yamada | |
| 4,561,925 A * | 12/1985 | Skerjanec et al. | 53/374.8 |
| 4,633,215 A * | 12/1986 | Anders et al. | 340/473 |
| D328,750 S | 8/1992 | Chou | |
| 5,142,123 A * | 8/1992 | Chou | 219/243 |
| 5,352,323 A | 10/1994 | Chi | |
| 5,374,806 A * | 12/1994 | Chou | 219/229 |
| 5,641,418 A * | 6/1997 | Chou | 219/229 |
| 6,627,853 B2 * | 9/2003 | Chou et al. | 219/243 |
| 6,936,790 B1 * | 8/2005 | Chou et al. | 219/243 |

FOREIGN PATENT DOCUMENTS

| | | |
|---|---|---|
| NL | 542359 | 8/1959 |
| TW | 040687 | 1/1988 |
| TW | 75203282 | 7/1988 |

* cited by examiner

ELECTRIC HEAT SEALER WITH SAFETY DEVICE

CROSS-REFERENCE TO RELATED APPLICATIONS

This application is a continuation of application No. 10/637,244, filed on Aug. 8, 2003, now U.S. Pat. No. 6,936,790, which is a continuation of application No. 09/735,257, filed on Dec. 12, 2000, now U.S. Pat. No. 6,627,853, which is a continuation of application No. 09/189,359, filed on Nov. 9, 1998, now U.S. Pat. No 6,232,579 which is a continuation-in-part of application No. 08/917,358, filed on Aug. 26, 1997, now U.S. Pat. No. 5,854,466.

FIELD OF THE INVENTION

The present invention relates to an electric heat sealer, and more particularly to an electric heat sealer which can be controlled to break the electric circuit when the apparatus is not in use, so as to prevent an electric connection by a false action.

BACKGROUND OF THE INVENTION

A variety of electric heat sealers have been developed for home use, and have appeared on the market. An example of such a device is disclosed in U.S. Pat. No. 5,142,123.

Conventional electric heat sealers are functional for sealing plastic bags and the like. However, these electric heat sealers have no safety control means. When an electric heat sealer is touched by an external force, the sealing mechanism may be electrically connected to produce heat, potentially causing an accident to occur.

A need exists for an electric heat sealer which eliminates the aforesaid problem, and which is handy and safe in use.

SUMMARY OF THE PREFERRED EMBODIMENTS

In accordance with one aspect of the present invention, there is provided an electric heat sealer comprising a casing, a battery chamber, a spring holder, a sealing mechanism, a press bar, and a safety device. The casing holds the battery chamber, the spring holder, the sealing mechanism and the safety device on the inside. The battery chamber comprises a front upright support; a rear upright support; a first front terminal plate and a second front terminal plate respectively mounted on the front upright support; a pair of rear terminal plates respectively mounted on the rear upright support; a first metal contact plate mounted on the front upright support and connected the first front terminal plate; and a second metal contact plate mounted on the front upright support and spaced from the second terminal plate by a gap. The second terminal plate is forced into contact with the second metal contact plate when a battery set is installed in the battery chamber. The spring holder is mounted in the casing and spaced between the first metal contact plate and the second metal contact plate. The sealing mechanism is mounted in the casing and moved up and down relative to the first and second metal contact plates.

The sealing mechanism comprises a heat insulative base; an electric wire; two metal locating plates; and a compression spring. The heat insulative base comprises a protrusive middle portion. The electric heating wire is mounted on the protrusive middle portion of the heat insulative base. The metal locating plates are fixedly fastened to the heat insulative base at two opposite sides and respectively connected to two opposite ends of the electric heating wire. The compression spring is connected between the spring holder and the protrusive middle position of the heat insulative base.

The press bar has a fixed end pivotally connected to one end of the casing and a free and fixedly mounted with a heat insulative press block. The heat insulative press block is forced against the protrusive middle portion of the heat insulative base of the sealing mechanism when the press bar is depressed.

The safety device comprises a safety switch with two opposite terminals. The safety switch has two lead wires respectively extended from the two opposite terminals thereof and respectively connected to the second terminal plate and the second metal contact plate.

In a preferred embodiment, the inventive electric heat sealer further includes a protective frame pivotally connected to the casing and pivotable between a first position and a second position. In the first position, the protective frame is spaced between the heat insulative base of the sealing mechanism and the heat insulative press block of the press bar. In the second position, the protective frame is pivoted out of the space between the base and the press block.

Preferably, the electric heat sealing wire and the press block are covered by heat insulative sheets, which preferably are comprised of a heat-resistant material such as a Teflon mesh.

In another preferred embodiment, the inventive heat sealer further includes a cover device for the casing. The cover device has defined therein an opening through which the protrusive middle portion of the heat insulative base of the sealing mechanism extends out of the casing. More specifically, the cover device includes a front cover plate disposed on a front portion of the casing, a rear cover plate disposed on a rear portion of the casing, and an intermediate cover plate disposed on a middle portion of the casing over the battery chamber.

In accordance with another aspect of the present invention, there is provided an electric heat sealer which includes a casing; a cover device; first and second metal contact plates; a sealing mechanism; resilient means, such as a spring, piston or the like, biasing the sealing mechanism in an upward direction; operating means pivotally connected to the casing; and a safety device.

The cover device covers the casing and has an opening formed therethrough. The first and second metal contact plates are mounted within the casing below the opening in the cover device. The sealing mechanism is mounted in the casing and moves up and down relative to the first and second metal contact plates. The sealing mechanism includes: a heat insulative base having a protrusive middle portion; an electric heating wire mounted on the protrusive middle portion of the heat insulative base, the electric heating wire having two opposite ends; and two metal locating plates mounted on the heat insulative base and respectively connected to the opposite ends of the electric heating wire.

The resilient means biases the sealing mechanism in an upward direction so that the protrusive middle portion of the heat insulative base extends through the opening in the cover device. The operating means is pivotally connected to the casing and extends above the opening in the cover device. The operating means is movable downwardly to engage an object to be sealed which is supported on the protrusive middle portion of the heat insulative base extending through the opening and urge the heat insulative base downwardly and cause the metal locating plates to engage the metal contact plates. This causes electrical current to flow through and heat the electric heating wire when the metal contact plates are connected to a source of electrical current.

The safety device selectively prevents electrical current from flowing through the electric heating wire.

In a preferred embodiment, the inventive heat sealer is adapted to be supplied with electrical current from at least one current source selected from the group consisting of a DC current source and an AC current source. Particularly, the inventive heat sealer is adapted to be supplied with electrical current from both a DC current source and an AC current source.

More particularly, the inventive heat sealer is adapted to be supplied with electrical current from a DC current source which is a battery set. In this embodiment, the casing defines a battery chamber adapted to receive a battery set, the battery chamber including a front upright support; a rear upright support; first and second front terminal plates respectively mounted on the front upright support; a pair of rear terminal plates respectively mounted on the rear upright support; a first metal contact plate mounted on the front upright support and connected to the first front terminal plate; and a second metal contact plate mounted on the front upright support and spaced from the second terminal plate by a gap. The second terminal plate is forced into contact with the second metal contact plate when a battery set is installed in the battery chamber.

Preferably, the safety device includes a safety switch having two opposite terminals and two lead wires respectively extending from the two opposite terminals thereof and respectively connected to the foregoing second terminal plate and the second metal contact plate.

In accordance with a further aspect of the present invention, there is provided an electric heat sealer comprising: a casing having an opening formed therethrough; first and second metal contact plates mounted within the casing below the opening; a sealing mechanism as described above, the sealing mechanism being mounted in the casing and moving up and down relative to the first and second metal contact plates; resilient means biasing the sealing mechanism in an upward direction so that the protrusive middle portion of the heat insulative base extends through the opening in the casing; operating means pivotally connected to the casing and extending above the opening in the casing as described above; and a safety device which selectively prevents electrical current from flowing through the electric heating wire.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
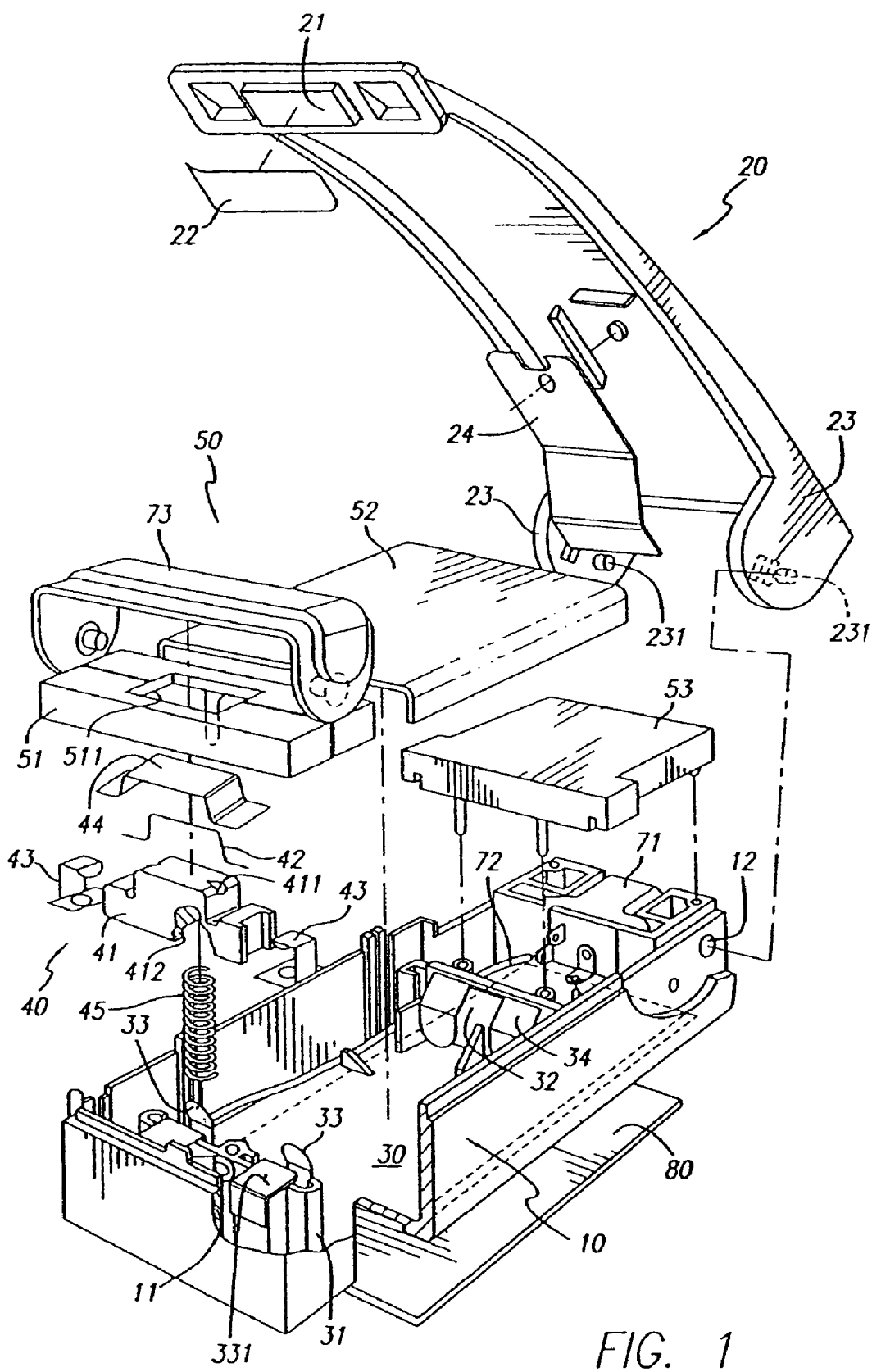
FIG. 1 is an exploded view of an electric heat sealer according to the present invention.
Figure 2:
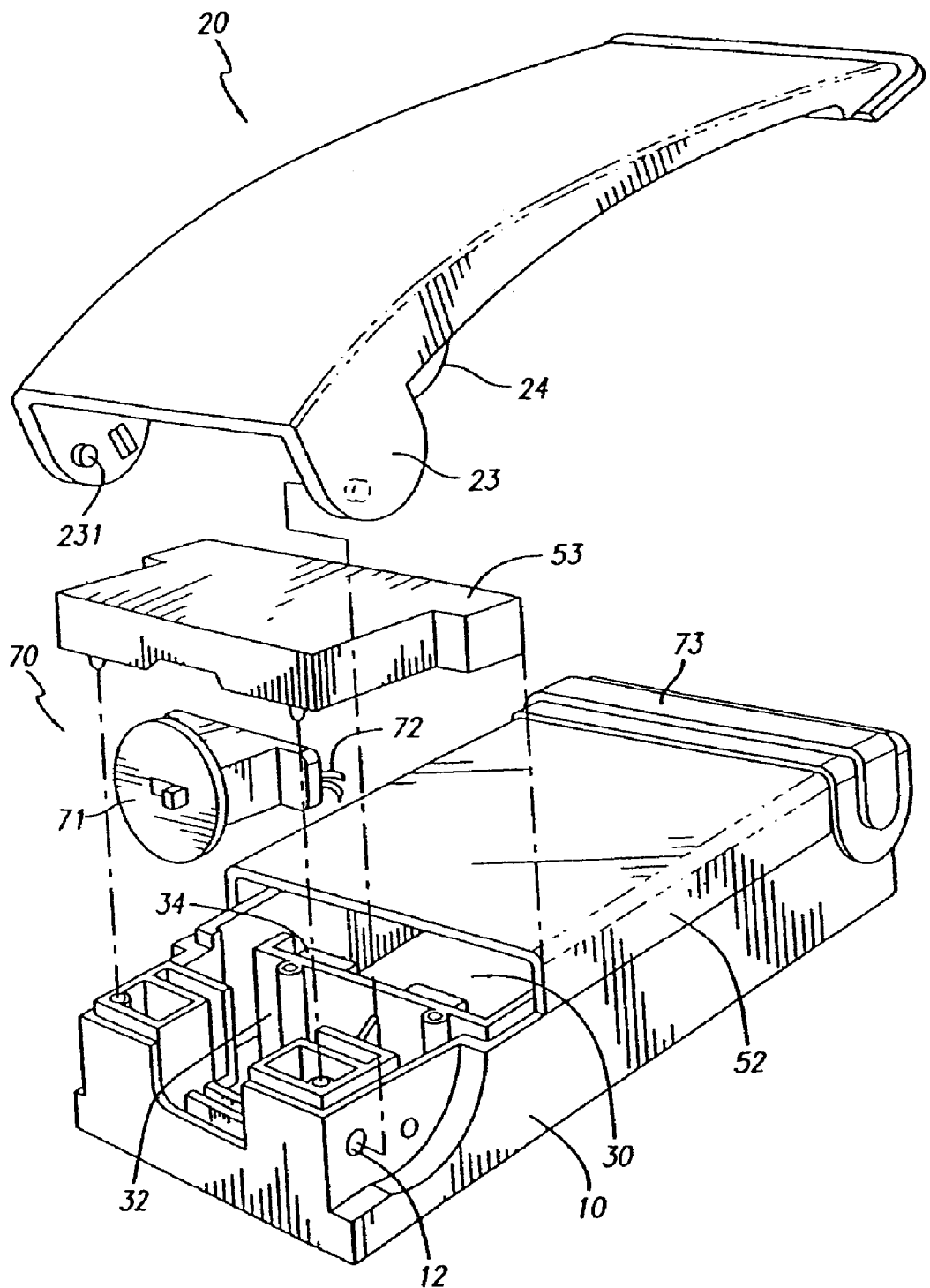
FIG. 2 is another exploded view of the present invention.
Figure 3:
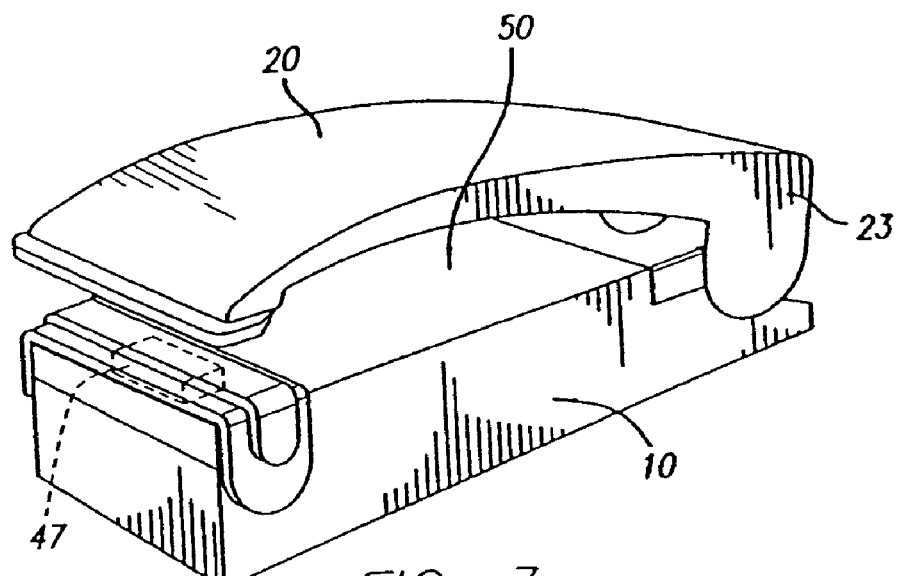
FIG. 3 is a perspective view of the present invention when viewed from the front side.
Figure 4:
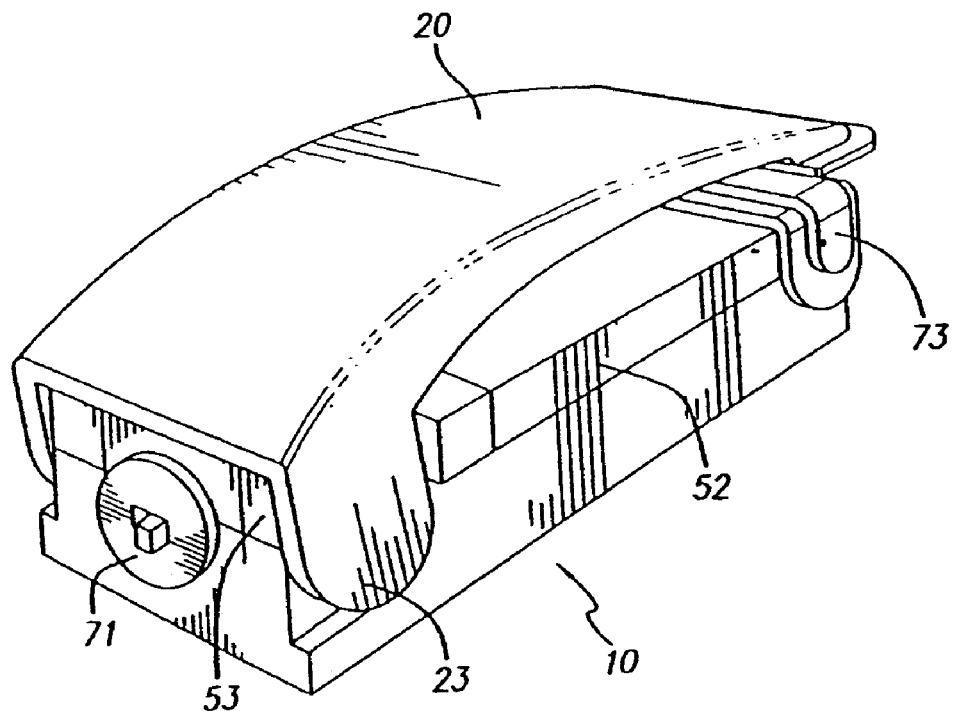
FIG. 4 is another perspective rear side view of the present invention when viewed from the rear side.

Referring to FIGS. 1-4 and 7, a first embodiment of an electric heat sealer in accordance with the present invention includes a casing 10, a spring holder 11, a press bar 20, a battery chamber 30, a sealing mechanism 40, and a safety device 70.

The battery chamber 30 is defined within the casing 10. The battery chamber 30 comprises a front upright support 31, a rear upright support 32, a pair of front terminal plates 33 and a rear terminal unit having a pair of rear terminal plates 34 respectively mounted on the front upright support 31 and the rear upright support 32. When battery cells (not shown) are installed in the battery chamber 30, the positive and negative terminals of the battery cells are respectively connected to the metal contact plates 33, 34.

A pair of flat metal contact plates 331 are mounted on the front upright support 31. One flat metal contact plate 331 is directly connected to one front terminal plate 33. Alternatively, the two plates 331 and 31 can form a single unit. The other flat metal contact plate 331 is spaced from the other front terminal plate 33 by a gap 332.

The spring holder 11 is mounted in the front upright support 31 between the flat metal contact plates 331.

The sealing mechanism 40 is mounted within the casing 10, comprising a heat insulative base 41, an electric heating wire 42, two metal locating plates 43, a heat resisting cover sheet 44, and a compression spring 45. The heat insulative base 41 comprises a protrusive middle portion 411. The locating plates 43 are fasted to two opposite sides of the heat insulative base 41 to hold the electric heating wire 42 on the protrusive middle portion 411. The heat resisting cover sheet 44 is covered on the heat insulative base 41 over the electric heating wire 42 to protect the electric heating wire 42. The heat insulative cover sheet 44 preferably is a meshed member, made from a heat-resistant material such as Teflon, providing a smooth surface. The heat insulative base 41 has a bottom mounting hole 412 at the bottom of the protrusive middle portion 411. The bottom mounting hole 412 is preferably a circular hole. The compression spring 45 has a bottom end received in the spring holder 11, and a top end inserted into the bottom mounting hole 412. The diameter of the compression spring 45 fits the circular bottom mounting hole 412 of the heat insulative base 41. Because the sealing mechanism 40 is supported on the compression spring 45, it can be moved up and down in the casing 10 and is biased in the upward direction.

The press bar 20 comprises a heat insulative press block 21 at one end facing the protrusive middle portion 411 of the heat insulative base 41 of the sealing mechanism 40, a heat resisting cover sheet 22 covered on the heat insulative press block 21, and a pair of lugs 23 bilaterally disposed at an opposite end. The lugs 23 have a respective pivot pin 231 at an inner side respectively inserted into two transverse pivot holes 12 at one end of the casing 10. The heat resisting cover sheet 22 of the press bar 20 and the heat resisting cover sheet 44 of the sealing mechanism 40 are preferably made from same material, such as a Teflon mesh. Further, a spring plate 24 is provided between the press bar 20 and the casing 10 to impart an upward bias to the press bar 20. Because of the arrangement of the spring plate 24, the press bar 20 is normally maintained in an upward position to prevent direct contact between the heat resisting cover sheet 22 at the press bar 20 and the heat resisting cover sheet 44 at the sealing mechanism 40.

The safety device 70 is for open circuit protection. Safety device 70 preferably includes a safety switch 71 and a protective frame 73. In the particular embodiment illustrated in FIGS. 2 and 4, the safety switch 71 is mounted in the casing 10 at the rear thereof. Safety device 70 has two lead wires 72 respectively extending from two opposed terminals thereof and respectively connected to one front terminal plate 33 (which is not directly connected to the corresponding flat metal contact plate 331) and one flat metal contact plate 331 (which is not directly connected to the corresponding front terminal plate 33). See FIG. 8.

Figure 8:
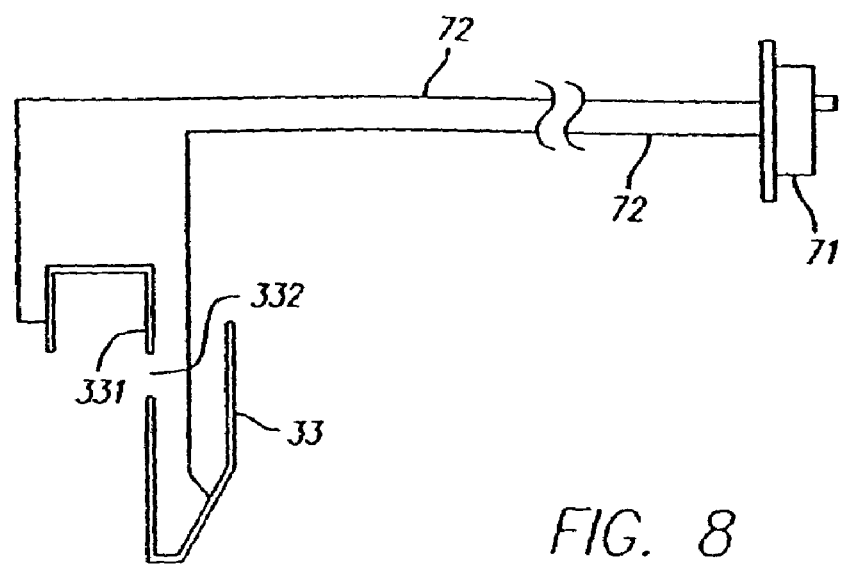
FIG. 8 is a circuit diagram showing the connection of an embodiment of a safety device of the invention (a safety switch) to the flat metal contact plate and front terminal plate of FIG. 7.

When the electric heat sealer is in use, the safety switch 71 is switched by a user to the "on" position. When the safety switch is in the "on" position, the gap 332 is bridged, enabling current to flow from terminal plate 33 to metal contact plate 331 as shown in FIG. 8. When the electric heat sealer is not in use, the safety switch 71 is switched by the user to the "off" position to keep the lead wires 72 in an open circuit state and prevent current from flowing from terminal plate 33 to contact plate 331 in FIG. 8. That is, the safety switch is a safety device that is adapted to selectively prevent electrical current from flowing through the electric heating wire. "Selectively" denotes that a user chooses a position which opens or closes the electric circuit and sets the device in the chosen position. The device remains in the selected state until the user changes the state of the device. Safety switch 71 can be a mechanical switch, an electrical device or any other device which permits selective prevention of electrical current flow.

Depressing the press bar 20 against the sealing mechanism 40 does not close the electric circuit when the safety switch 71 is set at the "off" position.

The protective frame 73 is pivotally connected to the casing 10 on the outside of the casing at the same end as the sealing mechanism 40. When the electric heat sealer is not in use, the protective frame 73 is pivoted upwards and retained between the heat insulative block 21 of the press bar 20 and the protrusive middle portion 411 of the heat insulative base 41 of the sealing mechanism 40 to stop the heat insulative block 21 from contacting the sealing mechanism 40. When in use, the protective frame 73 is pivoted outwardly and downwards to a position away from the heat insulative block 21 and the heat insulative base 41. Thus, the protective frame, by virtue of its pivotal motion between the foregoing two positions, is also adapted to selectively prevent electrical current from flowing through the electric heating wire.

Figure 5:
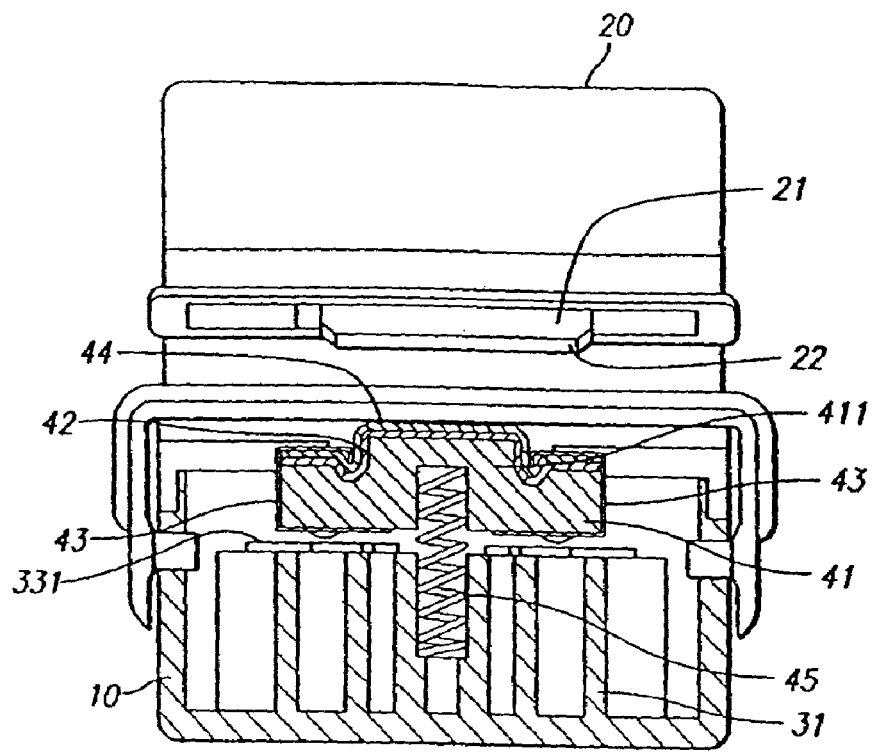
FIG. 5 is a sectional view of the present invention before operation.

Referring to FIG. 5, when the electric heat sealer is not in use, the heat insulative base 41 is biased upward by the compression spring 45 so that the locating plates 43 are spaced from the flat metal contact plates 331 to electrically disconnect the electric heating wire 42 from the battery cells. The safety switch 71 is switched to the "off" position, and the protective frame 73 is pivoted upward to the top side of the casing 10 and retained between the heat insulative press block 21 and the protrusive middle portion 411 of the heat insulative base 41 of the sealing mechanism 40. Therefore the electric heat sealer is deactivated and performs no work.

Figure 6:
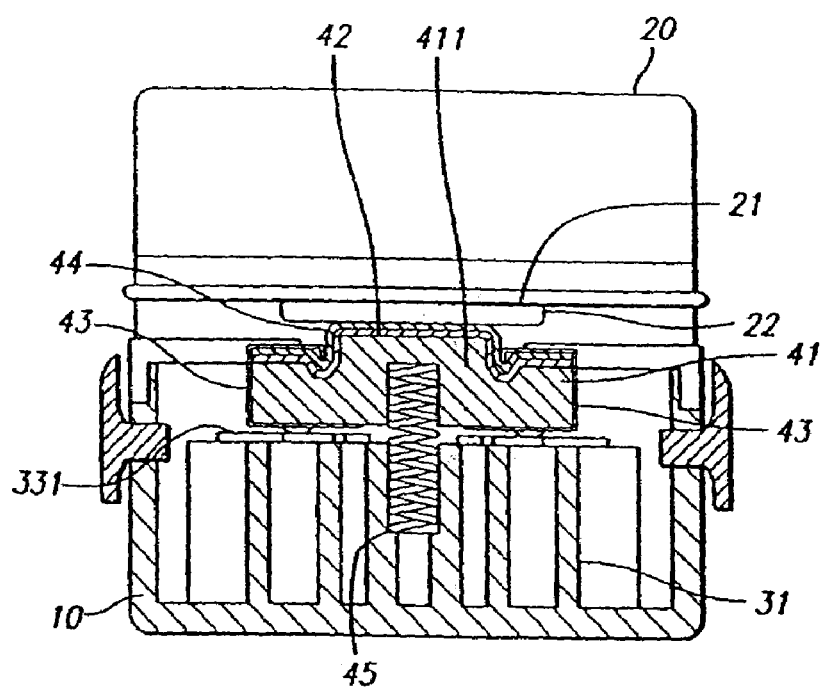
FIG. 6 is another sectional view of the present invention, showing the press bar pressed down.
Figure 7:
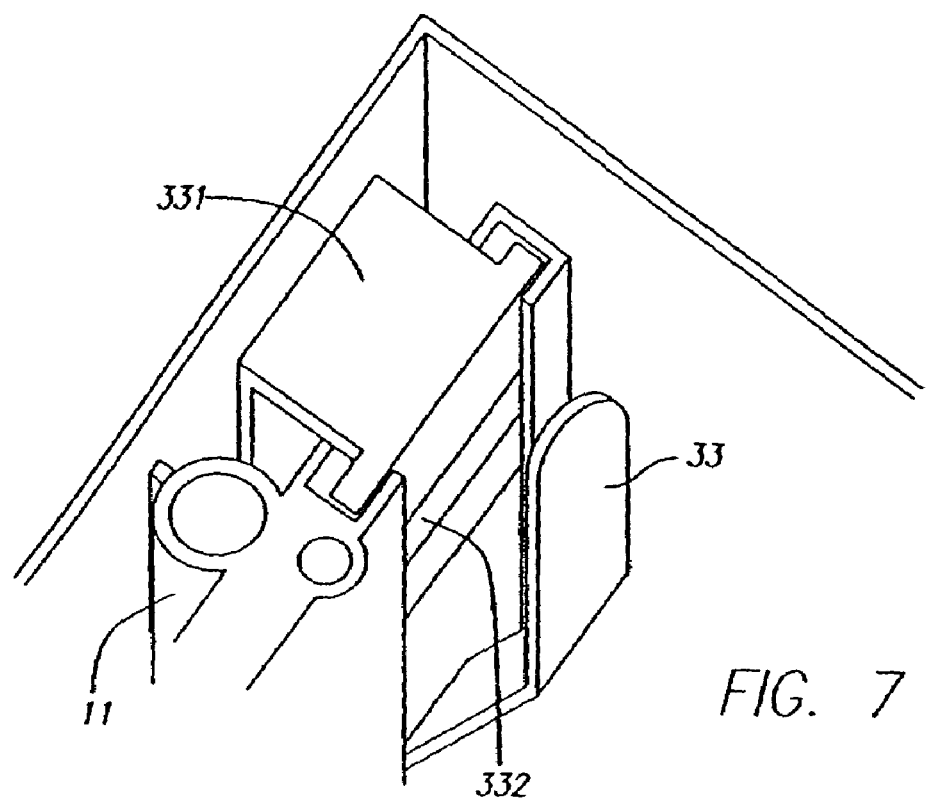
FIG. 7 is an enlarged view showing a flat metal contact plate and a front terminal plate separated by a gap.

Referring to FIG. 6, when in use, the protective frame 73 is pivoted outwardly and downwards from the position above the protrusive middle portion 411 of the heat insulative base 41 preferably to the front of the casing 10, and the safety switch 71 is switched to the "on" position to electrically connect the lead wires 72. When the press bar 20 is pressed down, the heat insulative press block 21 is forced against the heat insulative base 41. This causes the heat insulative base 41 to be lowered and forces the locating plates 43 into contact with the metal contact plates 331 to close the electrical circuit and heat the electric heating wire 42.

When sealing a workpiece, for example, a plastic bag, the open side of the plastic bag is placed between the protrusive middle portion 411 of the heat insulative base 41 and the heat insulative press block 21. Then the press bar 20 is pressed down to force the locating plates 43 into contact with the metal contact plates 331 respectively. This closes the electrical circuit, thereby causing the electric heating wire 42 to be heated. The open side of the plastic bag is thus melted and sealed by the heat produced by the electric heating wire 42. When the press bar 20 is released from the hand after use, the locating plates 43 are biased upward by the compression spring 45, along with the rest of the heat insulative base 41, from the metal contact plates 331 to open the electric circuit and prevent electrical current from the battery set from flowing through the electric heating wire 42.

In the foregoing embodiment, the inventive safety device includes both safety switch 71 and protective frame 73. If desired, either of these elements can be utilized separately.

Referring to FIG. 1 again, a cover device 50 is provided to cover the casing 10. The cover device 50 is comprised of a front cover plate 51, an intermediate cover plate 52, and a rear cover plate 53. The front cover plate 51 covers on the front portion of the casing 10 over the sealing mechanism 40. The intermediate cover plate 52 covers the middle portion of the casing 10 over the battery chamber 30. The rear cover plate 53 covers the rear portion of the casing 10. The front cover plate 51 has defined therethrough an opening 511 through which the protrusive middle portion 411 of the heat insulative base 41 extends.

Alternatively, cover device 50 can be comprised of two plates or can be formed from a single plate. That is, cover plates 51 and 52, 52 and 53, or 51-53 can be replaced with unitary structures.

Referring to FIG. 1 again, a magnetic bottom plate 80 is preferably fixedly mounted on the bottom of the casing 10. By means of the magnetic bottom plate 80, the electric heat sealer can be secured to a metal surface, for example a refrigerator door, by magnetic attraction.

Alternative embodiments of the foregoing heat sealer are also included within the scope of the present invention. In one alternative embodiment, the rear terminal unit can be replaced with two separate rear terminal plates 34 separated by a gap, and a safety switch can be connected between the plates 34 (rather than front plated 33 and 331 as described above) while the separated front plates 33 and 331 are placed in contact or form a single element.

In another alternative embodiment, electrical current can be supplied to electric heating wire 42 from an AC power source rather than a DC power source, or from both an AC power source and a DC power source. That is, the electric heat sealer can be adapted to be supplied with electrical current from at least one current source selected from an DC current source and an AC current source (including both DC and AC power sources). Exemplary alternative power sources for an electric heat sealer that can be adapted for use in the present invention are described, for example, in U.S. Pat. No. 5,142,123, which is incorporated herein in its entirety by reference. Safety switch 71 is disposed at an appropriate position in the electrical circuit between the electric heating wire and the DC and/or AC current source to selectively prevent current flow to the electric heating wire. Selection of the appropriate location for safety switch 71 in this embodiment is a matter of routine design choice for those skilled in the art.

In another alternative embodiment, the cover device 50 can be disposed on the bottom of the casing 10 rather than on the top of the casing, so that, for example, a battery set can be inserted from the bottom of the electric heat sealer. In this embodiment, if desired a magnetic bottom plate can be affixed to the cover device or a plate thereof if the cover device is comprised of multiple separate plates. In this embodiment an opening through which the protrusive middle portion 411 of the heat insulative base 41 extends is formed in an upper surface of the casing itself rather than in the cover device.

What is claimed is:

1. An electric heat sealer comprising:
    (a) a casing;
    (b) a sealing mechanism mounted within said casing, said sealing mechanism including:
        (i) a heat insulative base having a top, and
        (ii) an electric heating wire through which an electrical current can flow;
    (c) a frame having an opening defined therethrough;
    (d) a heat resistant cover sheet removably secured to said top of said heat insulative base by said frame;
    (e) operating means pivotally connected to said casing; and
    (f) a safety device which selectively prevents electrical current from flowing through said electric heating wire;
    wherein an opening is defined in said casing and said frame includes a downwardly extending post that engages the casing opening.

2. The electric heat sealer of claim 1 wherein said safety device comprises a protective frame pivotally connected to said casing on the outside thereof and pivotable between a first position in which said protective frame is disposed between said heat insulative base of said sealing mechanism and said operating means, and a second position in which said protective frame is not disposed there between.

3. The electric heat sealer of claim 1 wherein 8 said sealing mechanism further includes two metal locating plates mounted on said heat insulative base and respectively connected to opposite ends of said electric heating wired.

4. The electric heat sealer of claim 3 further comprising first and second metal contact plates mounted within said casing below said opening in said frame.

5. The electric heat sealer of claim 4 further comprising resilient means biasing said sealing mechanism in an upward direction so that said protrusive middle portion of said heat insulative base extends through said opening in said casing, and wherein said operating means is movable downwardly to engage an object to be sealed, the object being supported on said protrusive middle portion of said beat insulative base extending through said opening, and urge said heat insulative base downwardly and cause said metal locating plates to engage said First and second metal contact plates and heat said electric heating wire when said first and second metal contact plates are connected to a source of electrical current.

6. The electric heat sealer of claim 1 wherein said safety device further comprises a safety switch that selectively prevents electrical current from flowing through said electric heating wire.

7. The electric heat sealer of claim 1 which is adapted to be supplied with electrical current from at least one current source selected from the group consisting of a DC current source and an AC current source.

8. The electric heat sealer of claim 1 wherein said heat insulative base comprises a protrusive middle portion, and said electric heating wire is secured to said protrusive middle portion by said frame, and at least a portion of said protrusive middle portion extends through said opening in said frame.

9. An electric heat sealer comprising
    a) a housing having first and second opposite ends, said housing including a removable frame having an opening defined therethrough disposed at said first end, wherein said removable frame includes a downwardly extending post that engages an opening defined in said housing;
    b) a heating unit mounted within said housing, said heating unit including a heating element, and at least a portion of said heating unit being aligned with said opening in said frame;
    c) a source of current;
    d) a safety switch which selectively prevents electrical current from flowing through said heating element;
    e) circuitry connecting said heating element, said source of current and said safety switch; and
    f) a protective frame pivotally connected to said housing on the outside thereof.

10. An electric heat sealer comprising
    a) a housing having first and second opposite ends, said housing including a removable frame having an opening defined therethrough disposed at said first end;
    b) a heating unit mounted within said housing, said heating unit including a heating element, and at least a portion of said heating unit being aligned with said opening in said frame;
    c) a source of current;
    d) a safety switch which selectively prevents electrical current from flowing through said heating element;
    e) circuitry connecting said heating element, said source of current and said safety switch;
    f) a protective frame pivotally connected to a casing on the outside thereof; and
    g) a press bar having a rear end pivotally connected to the second end of the housing.

11. An electric heat sealer comprising
    (a) a casing;
    (g) a sealing mechanism mounted within said casing, said sealing mechanism including:
        (iii) a heat insulative base having a top, and
        (iv) an electric heating wire through which an electrical current can flow;
    (h) a frame having an opening defined therethrough;
    (i) a heat resistant cover sheet removably secured to said top of said heat insulative base by said frame;
    (j) operating means pivotally connected to said casing; and (k) a safety device which selectively prevents electrical current from flowing through said electric heating wire;

wherein said safety device comprises a protective frame pivotally connected to said casing on the outside thereof and pivotable between a first position in which said protective frame is disposed between said heat insulative base of said sealing mechanism and said operating means, and a second position in which said protective frame is not disposed there between.

12. The electric beat sealer of claim 11, wherein an opening is defined in said casing and said frame includes a downwardly extending post that engages the casing opening.

13. The electric heat sealer of claim 12 further comprising resilient means biasing said sealing mechanism in an upward direction so that said protrusive middle portion of said heat insulative base extends through said opening in said casing, and wherein said operating means is movable downwardly to engage an object to be sealed, the object being supported on said protrusive middle portion of said heat insulative base extending through said opening, and urge said heat insulative base downwardly and cause said metal locating plates to engage said first and second metal contact plates and heat said electric hearing wire when said first and second metal contact plates are connected to a source of electrical current.

14. The electric heat sealer of claim 11, wherein said heat insulative base comprises a protrusive middle portion, and said electric heating wire is secured to said protrusive middle portion by said frame, and at least a portion of said protrusive middle portion extends through said opening in said frame.

15. The electric heat sealer of claim 11, wherein said sealing mechanism father includes two metal locating plates mounted on said heat insulative base and respectively connected to opposite ends of said electric heating wire.

16. The electric heat sealer of claim 11 further comprising first and second metal contact plates mounted within said casing below said opening in said frame.

17. The electric heat sealer of claim 11 wherein said safety device further comprises a safety switch that selectively prevents electrical current from flowing through said electric heating wire.

18. The electric heat sealer of claim 11, the electric heat sealer being adapted to be supplied with electrical current from at least one current source selected from the group consisting of a DC current source and an AC current source.

* * * * *